US010482457B2

(12) United States Patent
Poole et al.

(10) Patent No.: US 10,482,457 B2
(45) Date of Patent: Nov. 19, 2019

(54) SYSTEM AND METHOD FOR TOKEN-BASED PAYMENTS

(71) Applicant: Capital One Services, LLC, McLean, VA (US)

(72) Inventors: Thomas S. Poole, Chantilly, VA (US); Janusz Michael Niczyporuk, Vienna, VA (US); Paul Young Moreton, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 609 days.

(21) Appl. No.: 14/132,508

(22) Filed: Dec. 18, 2013

(65) Prior Publication Data

US 2014/0108260 A1 Apr. 17, 2014

Related U.S. Application Data

(63) Continuation-in-part of application No. 13/653,759, filed on Oct. 17, 2012, now Pat. No. 10,242,368, and a continuation-in-part of application No. 13/441,505, filed on Apr. 6, 2012, now Pat. No. 9,183,490.

(60) Provisional application No. 61/738,595, filed on Dec. 18, 2012, provisional application No. 61/570,275, (Continued)

(51) Int. Cl.
*G06Q 20/38* (2012.01)
*G06Q 20/40* (2012.01)
*G06Q 20/32* (2012.01)
*H04B 5/00* (2006.01)

(52) U.S. Cl.
CPC ......... *G06Q 20/382* (2013.01); *G06Q 20/322* (2013.01); *G06Q 20/3226* (2013.01); *G06Q 20/3278* (2013.01); *G06Q 20/40* (2013.01); *G06Q 20/4014* (2013.01); *H04B 5/0031* (2013.01); *H04B 5/0062* (2013.01)

(58) Field of Classification Search
CPC .............. G06Q 20/382; G06Q 20/322; G06Q 20/3226; G06Q 20/3278; G06Q 20/40; G06Q 20/4014; H04B 5/0031; H04B 5/0062
USPC .......................................................... 705/64
See application file for complete search history.

(56) References Cited

U.S. PATENT DOCUMENTS 4,062,635 A   12/1977  Teh-Sheng
6,327,578 B1 * 12/2001  Linehan .......................... 705/65
6,412,701 B1   7/2002  Kohama et al.
(Continued)

OTHER PUBLICATIONS

Socio-economic benefits of SIM based NFC, Booz & Company, Nov. 2011, 47 pages (Year: 2011).*

(Continued)

*Primary Examiner* — James D Nigh
(74) *Attorney, Agent, or Firm* — Troutman Sanders LLP; Christopher J. Forstner; John A. Morrissett

(57) ABSTRACT

A system and method for enhanced token-based payments. The system and method including software and hardware to receive, via a network, a request for authorization; create, in response to the request, a dynamic payment packet (DPP) for payment; transmit, via a network, the DPP; receive, via a network, an authorization request, the DPP, and a transaction ID; receive at least one additional data element relating to the customer involved in the transaction and the transaction itself; and transmit, via a network, the transaction ID, an authorization response, and token.

16 Claims, 7 Drawing Sheets

Related U.S. Application Data filed on Dec. 13, 2011, provisional application No. 61/547,910, filed on Oct. 17, 2011.

(56) References Cited

U.S. PATENT DOCUMENTS

| | | | | |
|---|---|---|---|---|
| 8,364,578 | B1 * | 1/2013 | Honarvar | G06Q 30/02 705/26.62 |
| 8,533,123 | B2 | 9/2013 | Hart | |
| 8,595,800 | B1 | 11/2013 | Robinson et al. | |
| 8,639,629 | B1 * | 1/2014 | Hoffman | G06Q 20/20 705/44 |
| 8,762,259 | B1 * | 6/2014 | Tyo | G06Q 40/025 705/35 |
| 8,768,838 | B1 * | 7/2014 | Hoffman | G06Q 40/00 705/44 |
| 2002/0026478 | A1 * | 2/2002 | Rodgers et al. | 709/205 |
| 2002/0174153 | A1 | 11/2002 | O'Toole et al. | |
| 2003/0191719 | A1 * | 10/2003 | Ginter | G06F 21/10 705/54 |
| 2005/0010476 | A1 * | 1/2005 | Combs | 705/14 |
| 2006/0064380 | A1 * | 3/2006 | Zukerman | G06Q 20/10 705/44 |
| 2006/0149664 | A1 * | 7/2006 | Smyth | G06Q 30/02 705/38 |
| 2006/0160487 | A1 | 7/2006 | Nam et al. | |
| 2007/0022058 | A1 * | 1/2007 | Labrou et al. | 705/67 |
| 2007/0155430 | A1 | 7/2007 | Cheon et al. | |
| 2007/0188323 | A1 | 8/2007 | Sinclair et al. | |
| 2007/0198432 | A1 * | 8/2007 | Pitroda | G06Q 20/02 705/64 |
| 2008/0011837 | A1 | 1/2008 | Wesley | |
| 2008/0019131 | A1 | 1/2008 | Takei et al. | |
| 2008/0091530 | A1 * | 4/2008 | Egnatios | G06Q 20/10 705/14.25 |
| 2008/0128505 | A1 | 6/2008 | Challa | |
| 2008/0150679 | A1 | 6/2008 | Bloomfield | |
| 2008/0162361 | A1 | 7/2008 | Sklovsky et al. | |
| 2008/0183559 | A1 | 7/2008 | Frazier et al. | |
| 2008/0196940 | A1 | 8/2008 | Stobbe et al. | |
| 2008/0223918 | A1 * | 9/2008 | Williams et al. | 235/379 |
| 2008/0224825 | A1 | 9/2008 | Nystrom et al. | |
| 2008/0238610 | A1 | 10/2008 | Rosenberg | |
| 2009/0069050 | A1 | 3/2009 | Jain et al. | |
| 2009/0070583 | A1 * | 3/2009 | von Mueller et al. | 713/168 |
| 2009/0144456 | A1 | 6/2009 | Gelf et al. | |
| 2009/0266884 | A1 | 10/2009 | Killian et al. | |
| 2009/0307140 | A1 | 12/2009 | Mardikar | |
| 2010/0125508 | A1 | 5/2010 | Smith | |
| 2010/0151790 | A1 | 6/2010 | Hoeksel et al. | |
| 2010/0161433 | A1 | 6/2010 | White | |
| 2010/0184479 | A1 | 7/2010 | Griffin, Jr. | |
| 2011/0027768 | A1 * | 2/2011 | Vraney | G09B 19/00 434/322 |
| 2011/0161234 | A1 * | 6/2011 | Cuellar et al. | 705/75 |
| 2011/0178922 | A1 * | 7/2011 | Imrey | G06Q 20/10 705/39 |
| 2011/0312270 | A1 | 12/2011 | White | |
| 2012/0072336 | A1 * | 3/2012 | Le Vine | G06Q 40/025 705/38 |
| 2012/0166270 | A1 * | 6/2012 | Coppinger | 705/14.36 |
| 2012/0253852 | A1 * | 10/2012 | Pourfallah | G06Q 20/3276 705/4 |
| 2012/0310838 | A1 * | 12/2012 | Harris | G06Q 20/12 705/65 |
| 2013/0097078 | A1 | 4/2013 | Wong et al. | |
| 2013/0124346 | A1 | 5/2013 | Baldwin et al. | |
| 2013/0191227 | A1 | 7/2013 | Pasa et al. | |
| 2013/0203346 | A1 | 8/2013 | Han | |
| 2013/0212019 | A1 | 8/2013 | Mattsson et al. | |
| 2013/0246259 | A1 | 9/2013 | Dessert | |
| 2013/0288598 | A1 | 10/2013 | Parkin | |
| 2013/0311375 | A1 | 11/2013 | Priebatsch | |
| 2014/0074698 | A1 | 3/2014 | Poole et al. | |

OTHER PUBLICATIONS

International Search Report and Written Opinion from Application No. PCT/US2014/71152 dated Apr. 29, 2015.

Notification of Transmittal of The International Search Report and The Written Opinion of the International Searching Authority from Application No. PCT/US2015/32931 dated Oct. 28, 2015.

* cited by examiner

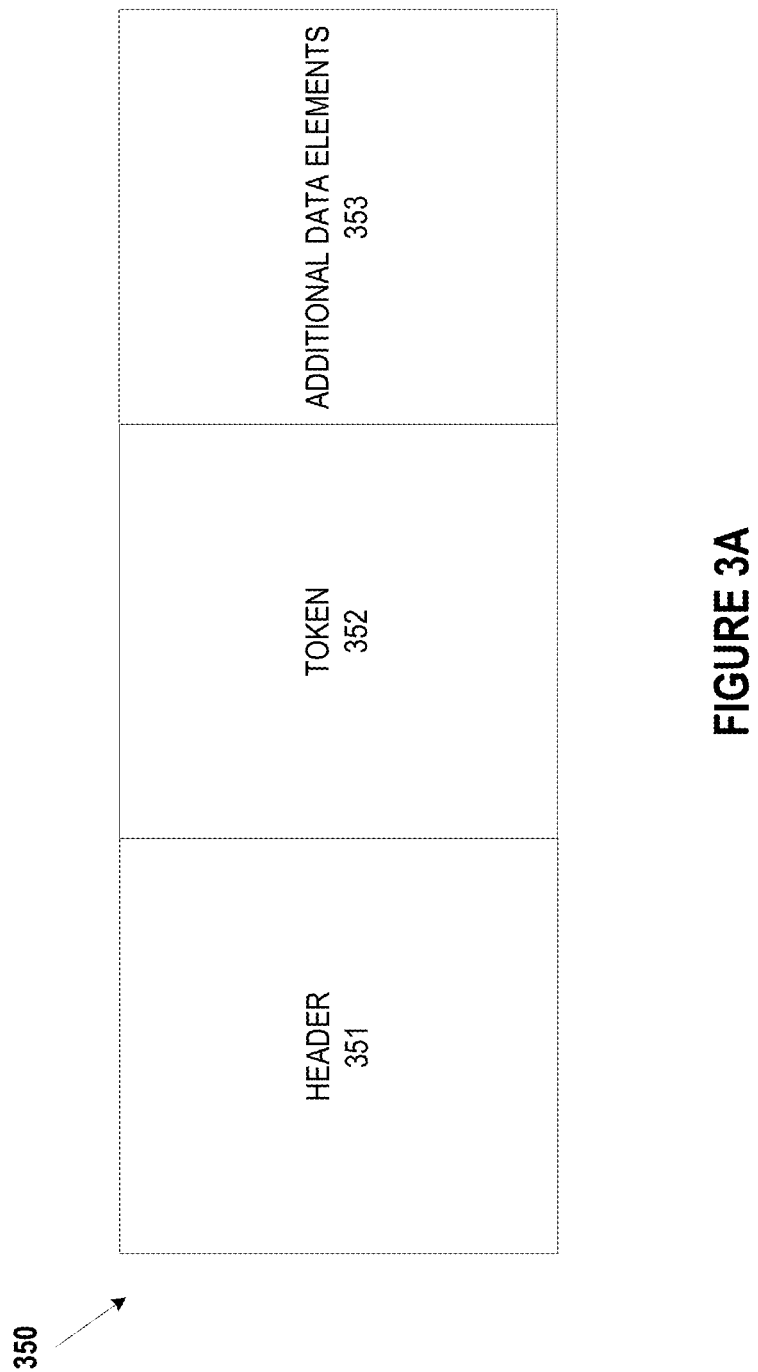

SYSTEM AND METHOD FOR TOKEN-BASED PAYMENTS

CROSS-REFERENCE TO RELATED APPLICATIONS

This application claims priority to U.S. Provisional Patent Application No. 61/738,595, filed on Dec. 18, 2012, the contents of which is incorporated herein by reference.

This application is a continuation-in-part of U.S. application Ser. No. 13/441,505, filed on Apr. 6, 2012, which claims priority to Provisional Application Nos. 61/570,275 filed Dec. 13, 2011, and 61/547,910, filed Oct. 17, 2011, the contents of which are incorporated herein by reference.

This application also is a continuation-in-part of U.S. application Ser. No. 13/653,759 filed Oct. 17, 2012, which claims priority to Provisional Application No. 61/547,910, filed Oct. 17, 2011, the contents of which are incorporated herein by reference in their entirety.

FIELD OF THE DISCLOSURE

The present invention relates to systems and methods for providing token-based commerce and payments.

BACKGROUND OF THE DISCLOSURE

Currently, in order to provide additional data elements with payment credentials, the combination of the underlying payment credentials and additional data elements must occur in a secure server that can only be accessed by the server/data owner.

However, this allows for the range of participants in commerce and/or payments to be strictly limited as it is required that all data be stored and owned by the issuer/manager of payments credentials data.

SUMMARY OF THE DISCLOSURE

Various embodiments of the present disclosure provide systems and methods for token-based commerce and payments. In an exemplary embodiment, a method for token-based payments includes receiving, via a network, a request for authorization; creating, in response to the request, a dynamic payment packet (DPP) for payment; transmitting, via a network, the DPP receiving, via a network, an authorization request, the DPP, and a transaction ID; and transmitting, via a network, the transaction ID, an authorization response, and actual account information.

The method may further include an interaction with various external systems, such as financial institutions, as well as an interaction with additional third parties, such as creditor-related systems, that may provide financial data or other customer related data for the transaction The interaction may include an authorization decision related to the authorization request, transaction ID, and/or dynamic payment packet. The interaction may further include receiving customer data associated with an account related to the external or third party system.

In various embodiments, the dynamic payment packet may be in the form of a token or data sent to an attachment of a mobile device. Furthermore, the dynamic payment packet may track data involved in the transaction.

A system for a token-based commerce may include a DPP manager that generates a DPP and provides the DPP to a mobile device of a customer for use with a transaction, a communication interface that receives the DPP in association with a transaction, and a processor that processes the DPP used to determine whether to authorize the transaction.

The system may also include a payment processor to process the transaction and/or a customer database or a plurality of customer databases that store a list of provided DPPs and a variety of data elements that may be associated with the DPP, including but not limited to, consumer creditworthiness information, consumer profile/relevance scores based on historical purchases and/or demographic data; geolocation data; rewards or loyalty points data; product/SKU-level data; and/or social network data.

The authorization determination of the system may further be based on a comparison of the received DPP to the list of provided DPPs and/or other provided data with the DPP. The DPP manager may receive an identifier associated with the mobile device, and the processor may utilize the authorization determination. Furthermore, the DPP manager may receive and/or provide additional data elements within the token.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which:

FIG. 3A depicts an example dynamic payment packet according to embodiments of the disclosure;

DETAILED DESCRIPTION OF THE EMBODIMENTS

Figure 1:
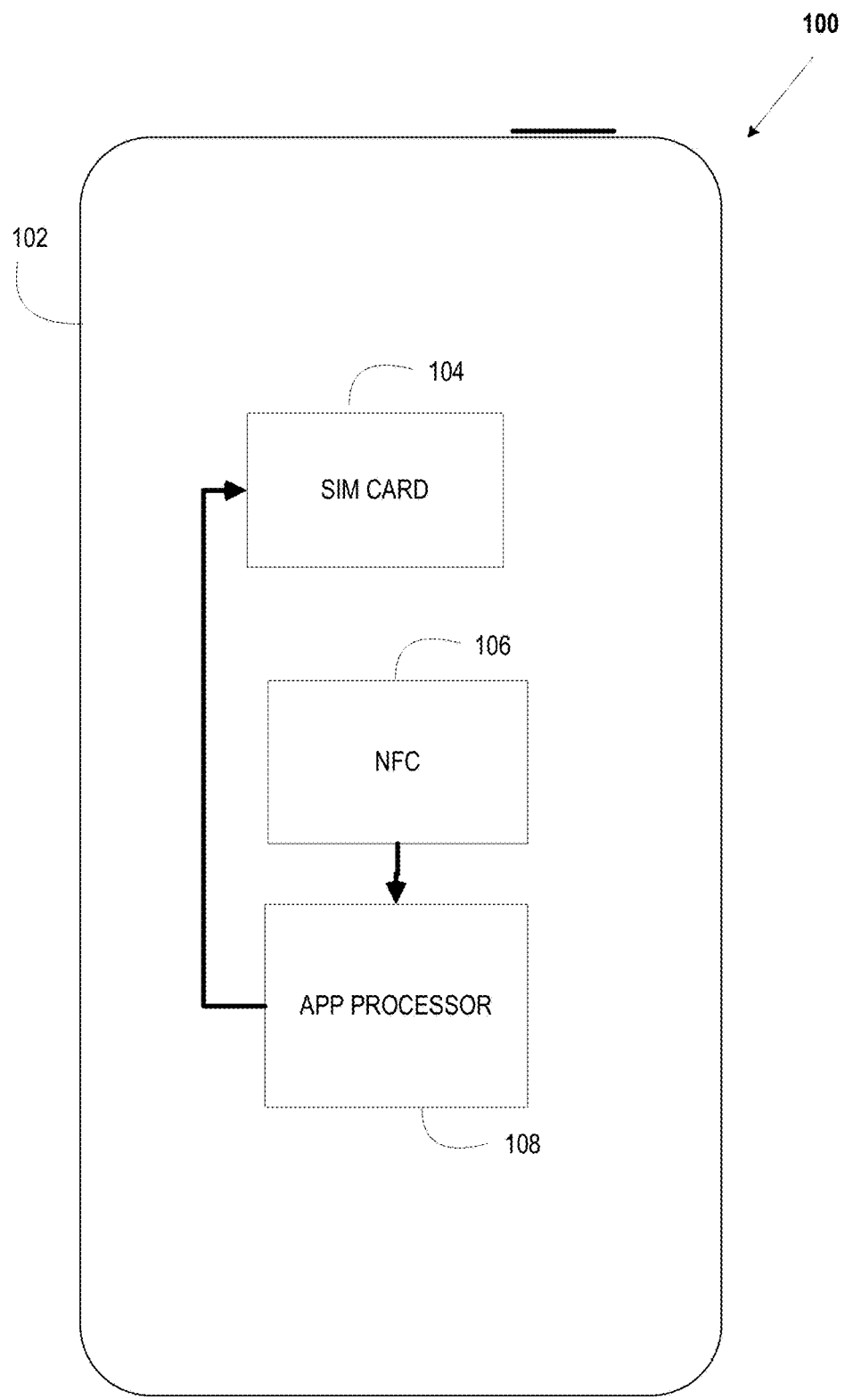
FIG. 1 depicts an example embodiment of a token-based commerce system according to embodiments of the disclosure.

The following description is intended to convey a thorough understanding of the embodiments described by providing a number of specific exemplary embodiments and details involving systems and methods for providing token-based payments. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions only.

Additionally, a token is used as an example of a dynamic payment packet (DPP). A token may be substituted for any other type of DPP including data packets transmitted to an attachment of a mobile device. As such, the disclosure is not intended to be limited to tokens. The embodiments disclosed below may refer to a variety forms of payment. It is to be understood that the token-based commercial system is agnostic to a mode of payment, and payment methods may include mobile contactless payments (using Near Field Communications, barcodes, RFID chip, etc.), remote electronic payments, and person-to-person payments, such as payments using a card with a magnetic strip or the like. Furthermore, the exemplary use of "mobile device" throughout the application is only by way of example, and the token-based payment may also be used with personal computers, tablet, smartcard, a payment card with a magnetic strip or chip, such as a credit card, gaming system, television, or any other device capable of making a payment.

According to the various embodiments of the present disclosure, systems and methods are provided to enable token-based payments. Such embodiments may provide, for example, a token-based, dynamic solution to commercial activity including: providing additional data elements within the token and enabling third parties to enhance payments in a secure manner. In various embodiments, the token-based solution could be provided in an online environment, whereby, for example, a mobile device such as a smartphone could receive a token during a payment transaction in "real-time" or near "real-time" via a communication network. The token-based solution could also be used in an offline manner, whereby a previously-provided token could be used for a certain period of time, regardless of whether the mobile device (e.g., smartphone) is connected to a communication network at the time of use. This token-based solution could eliminate the need for storing a credit card number and a card verification value (cvv) (or other security) code, for example, within a secure element on a smartphone. In effect, the tokens could serve as single-use, or limited-use credit card numbers.

The token-based solution could also allow credit-card issuers, for example, or any other token-issuer to set different types of parameters around the token. For example, transaction limits, use limits, time limits, and the like could be applied to the tokens. In other words, exemplary tokens could apply only to transactions of $100 or less, and/or only to 3 separate transactions before it expires, and only for 3 days. Token limits may also be restricted based on other factors, for example but not limited to: specific merchant(s) or store(s), merchant categories, geographical locations, or the like. Limits may be set differently for primary and secondary (authorized) users of the account. Limits may be set by the issuer of the token or users of the payment account.

In various embodiments, a token may be, for example, a multifaceted token, which may include, for example, numbers, letters and/or symbols that can be displayed on and/or typed into a mobile device. For example, the token could be a six- or eight-digit number or alphanumeric combination. The token may be randomly generated by a token manager or other entity for use by the token manager.

FIG. 1 depicts an exemplary system 100 for use with the token-based software solution for payment. As depicted in FIG. 1, system 100 may include a mobile device 102. Mobile device 102 may be any mobile device capable of executing a token-based payment. For example, mobile device 102 could be an iPhone, iPod, iPad from Apple® or any other mobile device running Apple's iOS operating system, any device running Google's Android® operating system, including, for example, smartphones running the Android® operating system and other wearable mobile devices, such as Google Glass or Samsung Galaxy Gear Smartwatch, any device running Microsoft's Windows® Mobile operating system, and/or any other smartphone or like device.

Mobile device 102 may include for example, a Subscriber Identity Module (SIM) card 104, an NFC module 106, and an App Processor 108. SIM card 104 may be an integrated circuit that securely stores the service-subscriber key the International mobile subscriber identity (IMSI) used to identify a subscriber on mobile telephony devices (such as mobile phones and computers). In various embodiments, IMSI may be used to identify the user of mobile device 102 and may have a unique identification associated with all cellular networks. The IMSI may be stored as, for example, a 64-bit field and may be sent by mobile device 102 to a network. The IMSI also may be used for acquiring other details of the mobile device 102 in a home location register (HLR) or as locally copied in a visitor location register. The IMSI may be used in any mobile network that interconnects with other networks. For GSM, UMTS and LTE networks, the IMSI may be provisioned in SIM card 104. For CDMA2000 networks, the IMSI may be provisioned in mobile device 102 directly or in the R-UIM card (i.e., the CDMA2000 analogue to a SIM card for GSM). In various embodiments, an IMSI may be presented as a 15 digit number. The first 3 digits may indicate the mobile country code (MCC), which may be followed by the mobile network code (MNC), either 2 digits (European standard) or 3 digits (North American standard). The length of the MNC may depend on the value of the MCC. The remaining digits may be the mobile subscription identification number (MSIN) within the network's customer base.

NFC module 106 may be an embedded NFC chip that can send encrypted data a short distance ("near field") to a reader located, for instance, next to a retail cash register. NFC module may contain an NFC antenna and secure element (SE). The SE may be a hardware chip specially designed to be tamper proof. In one embodiment, the SE may be used for digitally and physically secure storage of sensitive data, including payment data, health records, car key identifiers, etc. The SE may, for example, store information related to a person, customer, financial institution, or other entity. In certain implementations, the SE may also store information related to a financial account, such as, for example, a credit card number, debit account number, or other account identifier. The SE may include a computer processor or other computational hardware or software. As one example, the secure element may contain the Visa® and MasterCard® applications for PayWave® and PayPass® transactions.

The SE may have the ability to securely store various credentials. In one embodiment, the credentials may comprise credit card information. The credentials may expand beyond credit card payment info for use over NFC. As one example, the information stored on the Secure Element may be used to auto-complete on-line checkouts or enable purchases in other, third party applications. The Secure Element may also store keys, building access information, drivers licenses, passwords, loyalty card information, gift card information, transaction history, reward information, ATM access information, addresses, documents, pictures, or other data objects. The secure element may be capable of generating a Dynamic Card Security Code, such as a Dynamic Card Verification Value (CVV3) or other security code.

NFC module 106 may enable Industry Standard NFC Payment Transmission. For example, the NFC module 106 may enable two loop antennas to form an air-core transformer when placed near one another by using magnetic induction. NFC module 106 may operate at 13.56 MHz or any other acceptable frequency. Also, NFC module 106 may provide for a passive communication mode, where the initiator device provides a carrier field, permitting answers by the target device via modulation of existing fields. Additionally, NFC module 106 also may provide for an active communication mode by allowing alternate field generation by the initiator and target devices.

NFC module 106 may deactivate the RF field while awaiting data. The attachment may use Miller-type coding with varying modulations, including 100% modulation. The attachment may also use Manchester coding with varying modulations, including a modulation ratio[[n]] of 10%. Additionally, the attachment may be capable of receiving and transmitting data at the same time, as well as checking for potential collisions when the transmitted signal and received signal frequencies differ.

NFC module 106 may be capable of utilizing standardized transmission protocols, for example but not by way of limitation, ISO/IEC 14443 A/B, ISO/IEC 18092, MiFare, FeliCa, tag/smartcard emulation, and the like. Also, NFC module 106 may be able to utilize transmission protocols and methods that are developed in the future using other frequencies or modes of transmission. NFC module 106 may also be backwards-compatible with existing payment techniques, for example RFID. Also, the system may support transmission requirements to meet new and evolving payment standards including internet based transmission triggered by NFC.

App Processor 108 may enable execution of software applications on mobile device 102. In various embodiments, app processor 108 may cooperate with NFC module 106 to enable a token-based payment using mobile device 102. Additionally, mobile device 102 may include an attachment for contactless payments (not shown), such as a contactless payment attachment that plugs into an audio jack or plug of a mobile device.

Mobile device 102 may also include various software components to facilitate token-based payments. For example, mobile device 102 may include an operating system such as, for example, the iOS operating system from Apple, the Google Android operating system, and the Windows Mobile operating system from Microsoft. Mobile device 102 may also include, without limitation, software applications such as mobile banking applications to facilitate token-based payment, an NFC application programming interface, and software to enable touch sensitive displays. Mobile device manufacturers may provide software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, and a real-time data (RTD) API and a NFC Data Exchange Format (NDEF) API for reading/writing.

Figure 2:
FIG. 2 depicts an exemplary embodiment of a token-based commerce system according to embodiments of the disclosure.

FIG. 2 also depicts an exemplary system 200 for use with the token-based payment system. System 200 may include a mobile device 202. Mobile device 202 may include a display 204 which may display software, including software applications, executing on mobile device 202. By way of a non-limiting example, one of the software applications executing on mobile device 204 may include a mobile payments application 206. In various exemplary embodiments, mobile payments application 206 may enable a token-based payment and commerce solution as described in more detail below. A user may select mobile payments application 206, by for example, touching display 204, which may then launch or otherwise cause the execution of mobile payments application 206.

Figure 3:
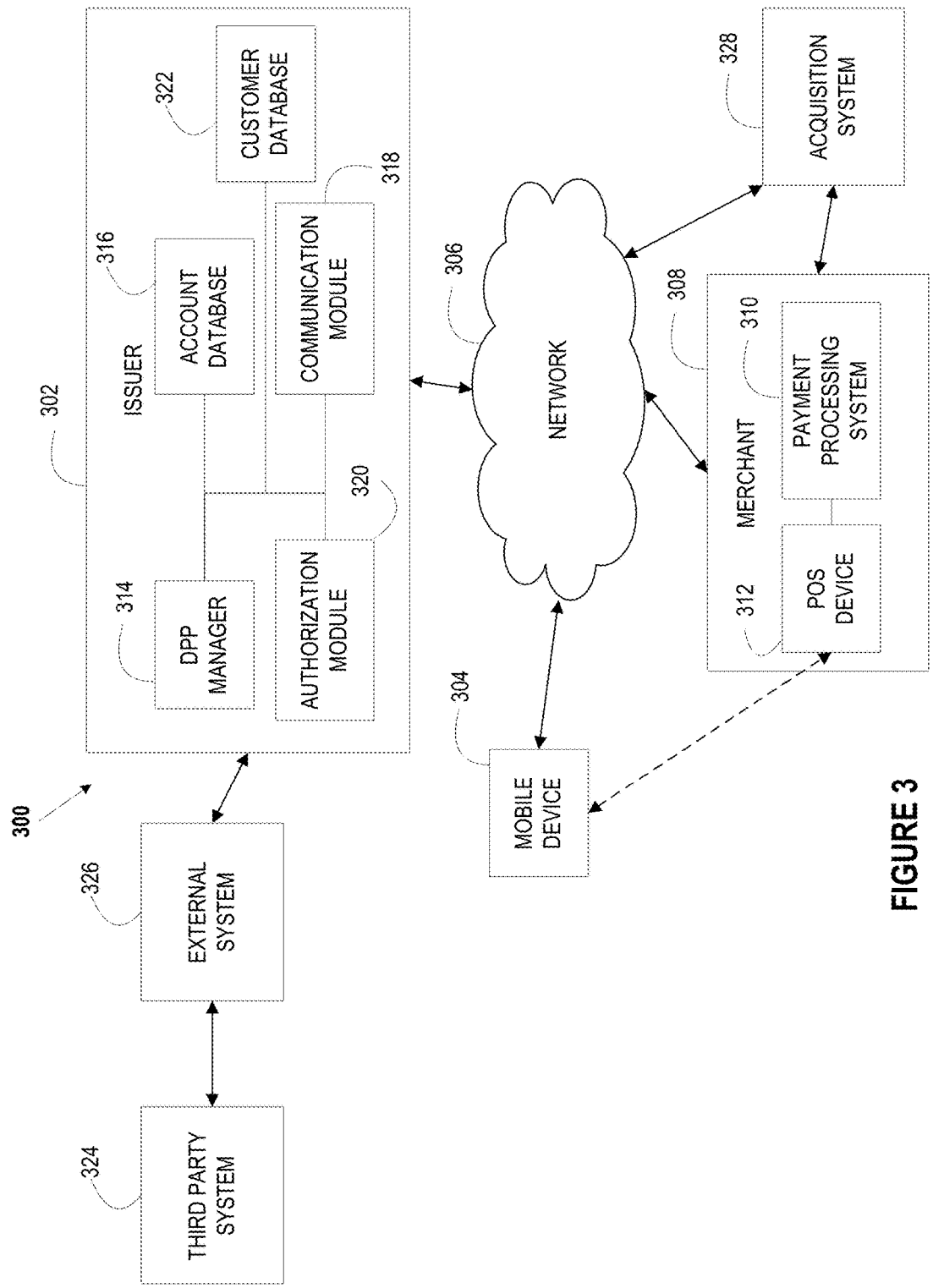
FIG. 3 depicts an exemplary embodiment of a token-based commerce system according to embodiments of the disclosure.

FIG. 3 depicts an exemplary system 300 for use with the token-based software solution. System 300 may include an issuer system 302, a mobile device 304, a network 306, a merchant system 308, an acquisition system, a third party system 324, and an external system 326. The third party system 324 or external system 326 of system 300 may be optional, and where data stored within those systems is included in the issuer system 302, the external system 326 and third party system 324, may not be necessary. In various embodiments, mobile device 304 may be similar to those described above with respect to FIGS. 1 and 2.

Network 306 may enable communication between mobile device 304, issuer 302, and merchant 308. For example, Network 306 may be one or more of a wireless network, a wired network or any combination of wireless network and wired network. For example, network 306 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 306 may include, without limitation, telephone lines, fiber optics, IEEE Ethernet 902.3, a wide area network ("WAN"), a local area network ("LAN"), or a global network such as the Internet. Also network 306 may support an Internet network, a wireless communication network, a cellular network, or the like, or any combination thereof. Network 306 may further include one network, or any number of the exemplary types of networks mentioned above, operating as a stand-alone network or in cooperation with each other. Network 306 may utilize one or more protocols of one or more network elements to which they are communicatively coupled. Network 306 may translate to or from other protocols to one or more protocols of network devices. Although network 306 is depicted as a single network, it should be appreciated that according to one or more embodiments, network 306 may comprise a plurality of interconnected networks, such as, for example, the Internet, a service provider's network, a cable television network, corporate networks, and home networks.

In various example embodiments, issuer system 302 may be associated with, for example, a credit card issuer. A credit card issuer may be a bank or credit card company that offers credit cards to its customers, thus making a credit limit available to cardholders. In a payment transaction, the credit card issuer may be responsible for sending the payment to the merchant for a purchase made with a credit card from that issuer. Issue system 302 also may be associated with a debit card issuer, which may be a financial institution that issues a plastic payment card (e.g., a debit card) that provides access to the cardholder's bank account at the financial institution.

Issuer system 302 may include, for example, a DPP manager 314, an account database 316, a communication module 318, an authorization module 320, and a customer database 322. DPP manager 314 may generate, maintain, and provide information relating to the tokens used for payments in a commercial system. In various embodiments, DPP manager 314 may be integrated into issuer system 302 as depicted in FIG. 3. DPP manager 314 may also be a third-party system (not shown) that works in cooperation with issuer system 302 to generate, maintain, and provide tokens for use with payments in a commercial system.

FIG. 3A depicts a DPP 350 that may be managed by, for example, DPP manager 314. As shown in FIG. 3A, DPP 350 may include a header 351, a token 352, and additional data elements 353. DPP 350 may enable multiple additional data elements to be combined with tokenized payment credentials, for example, to enhance tokenized payments. In various embodiments, additional data elements could be part of the token 351, or may be separate.

As shown in FIG. 3A, header 351 may refer to supplemental data placed at the beginning of a block of data being stored or transmitted. This supplemental data may include, for example, a sender's and the recipient's IP addresses, the protocol governing the format of the payload and several other formats. In various embodiments, the format of header 351 may be specified in, for example the Internet Protocol.

Token 352 may be, for example, a multifaceted token, which may include, for example, numbers, letters and/or symbols that can be displayed on and/or typed into a mobile device. For example, the token could be a six- or eight-digit number re alphanumeric combination. The token may be randomly generated by a token manager or other entity for use by the token manager.

Additional data elements 353 may include, for example, information about consumer creditworthiness (e.g., FICO) to enable real-time financing options related to a payment or the cross-selling of other lending products (e.g., auto loans) where underwriting decisions may be influenced by creditworthiness; consumer profile and/or relevance scores based on historical purchases and/or demographic data (e.g., age, gender, home/work address) to enable targeted offers, marketing, or advertising, delivered thought any Internet connected device e.g., mobile smartphone, tablet, PC, Internet-connected TV and/or wearable mobile device); geolocation information (e.g., of a mobile device, tablet, or other wearable mobile device) to enable location-based offers or check-ins immediately after a purchase; rewards information or loyalty points credentials (e.g., card rewards, airline/hotel points, virtual currencies) to enable "pay with points" applications at the point of purchase (either in full or in part); product/SKU-level information to enable electronic receipt generation and capture, product-level offers and discounts, warranty and other upsells, and other product level recommendations; and/or social network credentials (e.g., relating to Facebook, Twitter, LinkedIn, Instagram and the like) to enable social network broadcasting, sharing, and/or viewing of "purchase story" including but not limited to merchant location, purchase time, purchase amount, merchant name, products purchased, offers redeemed, rewards earned or redeemed, and payment card brand/type. In various embodiments, additional data elements 353 may be provided to Issuer 302 or a manager of the tokens or by third parties e.g., mobile operators, merchants, marketing firms, loyalty program managers, and/or mobile application developers. Tokens 352 along with the combined data elements 353 may be shared, for example, with third parties, enabling the third parties to provide customers with enhanced commerce experiences.

Referring back to FIG. 3, account database 316 may maintain information relating to the accounts of customers associated with an issuer. As referred to herein, an issuer may include, for example, a credit card issuer, or any other issuer of tokens or other dynamic payment packets for payment in a commercial system 300. Account database 316 may also include an association of tokens with respective customers. For example, account database 316 may include an association of a token "123456" with account number "1234 5678 9012 3456," which belongs to John Q. Cardholder. As will be described in more detail below, account database 316 may be accessed for authorizing transactions and or payment requests.

Communication module 318 may enable communication between the components of system 300. Communication module 318 may include hardware, software, and firmware that may enable communication between an issuer system 302 and other components of system 300 using network 306, for example.

Authorization module 320 may include business logic used to determine whether a transaction or payment request should be authorized. For example, authorization module 320 may include executable programs that determine whether a token is associated with the correct mobile device 304 and/or issuer account and whether the token use is within the limiting parameters before authorizing a particular transaction. Authorization module 320 may cooperate with communication module 318 to communicate authorization decisions to merchant 308 and/or mobile device 304.

Figure 4:
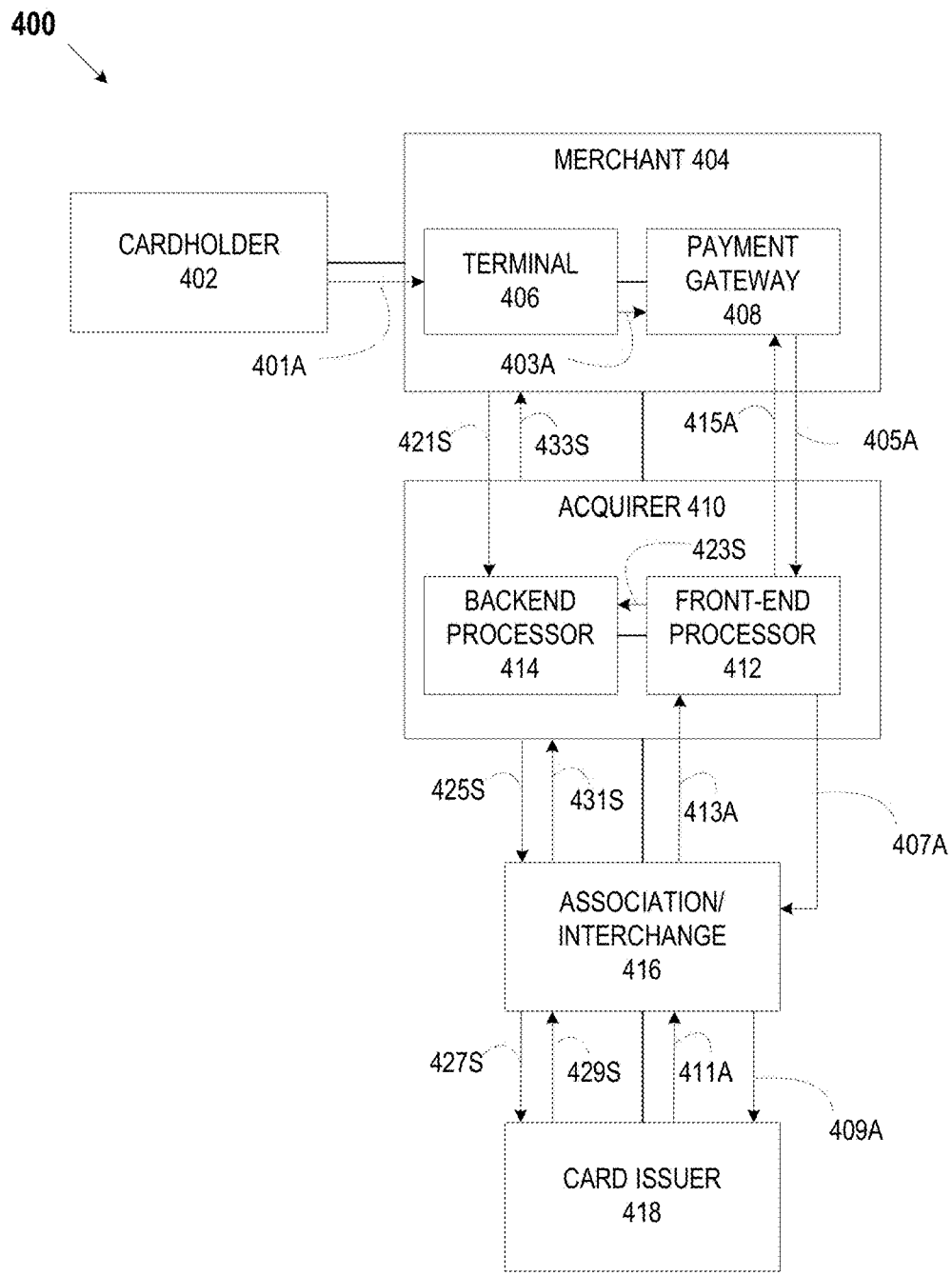
FIG. 4 depicts an example card authorization system according to embodiments of the disclosure.

FIG. 4 depicts an example system D00 and method for card authorization. Authorization module 320 depicted in FIG. 3 may be associated with, for example, Issuer 418 of FIG. 4. As shown and described in FIG. 4, merchants, cardholders and financial institutions may be connected with a card association network to enable secure transactions and timely payments. System 400 may include a cardholder 402, merchant 404, Acquirer 410, Association/Interchange 416, and card issuer 418.

Cardholder 402 may be any card holder, including a credit card holder, debit card holder, stored value card holder and the like. Cardholder 402 may possess a plastic card or carry a device (e.g., a mobile device) that securely stores card credentials and is capable of transmitting the card credentials to, for example, a PoS terminal (e.g., terminal 406). Cardholder 402 may interact with a merchant (e.g., merchant 404) by presenting a card or card credentials to a terminal (e.g., terminal 406).

Merchant 404 may be any merchant that accepts payment from a cardholder, for example. Merchant 404 may be any retailer, service provider, business entity, or individual that accepts payments. Merchant 404 may include software, firmware and hardware for accepting and/or processing payments. For example, as illustrated in FIG. 4, merchant 404 may include a terminal 406 and a payment gateway 408. Terminal 406 and payment gateway 408 may comprise the physical or virtual device(s) used by merchant 404 to communicate information to front-end processor 412 of acquirer 410. Terminal 406 may be similar to PoS system 500 as shown and described below in FIG. 5. In various embodiments, payment gateway 408 may be an e-commerce application service provider service that authorizes payments for merchants. As such, payment gateway 408 may be a virtual equivalent of a PoS terminal and interface with, for example, a billing system of merchant 404 and pass data to front-end processor 412 of acquirer 410.

Acquirer 410 may be, for example, a financial institution or bank, that holds the contract for providing payment processing services to merchant 404. Merchant 404 may have a merchant account that may serve as a contract under which Acquirer 410 may extend a line of credit to a merchant who wishes to accept, for example, credit card transactions. As shown in FIG. 4, Acquirer 410 may be associated with front-end processor 412 and back-end processor 414.

In various examples, front-end processor 412 may be a platform that card terminal 406 and/or payment gateway 408 communicate with when approving a transaction. Front-end processor 412 may include hardware, firmware, and software to process transactions. Front-end processor 412 may be responsible for the authorization and capture portion of credit card transaction. Front-end processor 412 also may include additional front-end platform interconnections to support, for example, ACH and debit transactions.

Backend processor 414 may be a platform that takes captured transactions from front-end processor 412 and settles them through an Interchange system (e.g., association/interchange 416). Back-end processor 414 may generate, for example, daily ACH files for merchant settlement. Back-end processor 414 also may handle chargeback handling, retrieval request and monthly statements.

Association/interchange 416 may be the consumer payment system whose members are the financial institutions that issue payment cards and/or sign merchant to accept payment cards. Example associations/interchanges 416 may include, Visa®, MasterCard®, and AmericanExpress®. Association/interchange 416 may include one or more computer systems and networks to process transactions.

Issuer 418 may be a financial institution that issues payment cards and maintains a contract with cardholders for repayment. In various embodiments, issuer 418 may issue credit, debit, and/or stored value cards, for example. Example issuers may include, Capital One, Bank of America, Citibank, and the like.

In various embodiments, processing a payment card transaction may involves two stages: (1) authorization and (2) clearing and settlement. Authorization may refer to an electronic request that is sent through various parties to either approve or decline the transaction. Clearing and Settlement may refer to settlement of the parties' settle accounts to enable the parties to get paid.

During authorization, cardholder 402 may present payment card as payment (401A) at merchant 404 PoS terminal 406, for example. Merchant 404 may enter card into a physical PoS terminal 406 or submit a credit card transaction to a payment gateway 408 on behalf of cardholder 402 via secure connection from a Web site, retail location, or a wireless device.

Payment gateway 408 may receive the secure transaction information (403A) and may pass the secure transaction information (405A) via a secure connection to the merchant acquirer's 410 front-end processor 412.

Front-end processor 412 may submit the transaction (407A) to association/interchange 416 (e.g., a network of financial entities that communicate to manage the processing, clearing and settlement of credit card transactions). Association/interchange 416 may route the transaction (409A) to the customer's Issuer 418. Issuer 418 may approve or decline the transaction and passes the transaction results back (411A) through association/interchange 416. Association/interchange then may relay the transaction results (413A) to front-end processor 412.

Front-end processor 412 may relay the transaction results (415A) back to the payment gateway 408 and/or terminal 406. Payment gateway 408 may store the transaction results and sends them to merchant 404. Merchant 404 may receive the authorization response and complete the transaction accordingly.

During settlement, merchant 404 may deposit the transaction receipt (421S) with acquirer 410 via, for example, a settlement batch. Captured authorizations may be passed (423S) from front-end processor 412 to the back-end processor 414 for settlement. Back-end processor may generates ACH files for merchant settlement. Acquirer may submit settlement files (425S, 427S) to Issuer 418 for reimbursement via association/interchange 416. Issuer 418 may post the transaction and pay merchant 404 (429S, 431S, 433S).

Referring back to FIG. 3, customer database 322 may include additional data elements that may be combined with tokenized payment credentials to enhance the payment experience. These additional data elements could be part of the payment token itself (and stored within the issuer system 302, for example) or the additional data elements may be stored separately in another token (e.g., a token issued from an external system 326 or a third party system 324). Examples of additional data elements include: consumer creditworthiness information (including but not limited to FICO) to enable real-time financing options related to the payment, or the cross-selling of other lending products (e.g., auto loans) where underwriting divisions are influenced by creditworthiness; consumer profile/relevance scores based on historical purchases and/or demographic data (e.g., age, gender, home/work address) to enable targeted offers, marketing, or advertising, delivered through any internet connected device; geolocation data (e.g., of a mobile smartphone or tablet) to enable location-based offers or check-ins in real-time or near real-time to purchase; reward or loyalty points credentials (e.g., card rewards, airline/hotel points, virtual currencies) to provide a "pay with points" option at point of purchase, either in full or in part; product/SKU-level data to enable electronic receipt generation and capture and to provide product-level offers and discounts, warranty and other upsells, and other product level recommendations; and social network credentials (e.g., Facebook, Twitter, LinkedIn) to enable social network broadcasting, sharing, and/or viewing of "purchase story" including, but not limited to, merchant location, purchase item, purchase amount, merchant name, products purchaser, offers redeemed, rewards earned or redeemed, and payment card brand/type. These additional data elements may be provided by the issuer or manager of the payments token 302, or by a third party system 324 or an external system 326. The token can also be shared with a third party system 324 or external system 326, enabling them to provide consumers with an enhanced commercial experience. Security of consumer data and payment credentials is maintained as the tokens are of limited use and encrypted.

By combining additional data elements with the tokenized payment credentials, the various embodiments may provide additional functionality associated with the payment to the merchant 308 to provide various commerce and payment experiences. By way of example, the additional data elements described above may allow a user of the mobile device 304 to finance payment of a transaction using loan financing, or cross-selling of other lending products. For example, when a user provides a tokenized payment using a mobile device 304, the user may be presented with the option to finance a large purchase with a variety of loan offers, such as a loan from a particular financial institution.

A commerce experience may further be enhanced using, for example, consumer profile and relevance scores as described above that allow a user to be pre-approved for targeted offers, marketing/advertising coupons, or the like. For example, a user who is of a certain age, gender, or lives or works at a particular address may be provided with certain offers that are specific to that user.

Geolocation data may also be used to provide a consumer with location-based offers. For example, a user who allows a mobile-device to include location data in the tokenized payment, or who may authorize a merchant to provide location data to the issuer, may be provided with an offer, discount, deal or reward associated with a specific merchant location.

Rewards or loyalty data may be used in lieu of or in combination with any other form of payment associated with the tokenized payment. Product or SKU-related data may provide instantaneous discounts associated with a purchase, upsell offers associated with the purchase, and or deals associated with related products. By way of example, a user may purchase a grill may be given offers, discounts, deals, or the like associated with patio furniture, grill supplies, or outdoor gaming equipment.

Furthermore, social networking credentials, where a user may broadcast, share, like, comment, and/or view anything related to the purchase (e.g., merchant, merchant location, or product/service data), may provide rewards and/or a variety of offers to the social networking member in relation to the purchase. For example, if a user broadcasts about a purchase, the user may be given a discount, offer, or reward associated with the purchase.

Any of the offers, coupons, discounts, deals, or the like may be applied to a current purchase and/or saved for a future purchase. When used in current purchase, the offers, coupons, discounts, or deals may be applied in real time prior to payment authorization (an automatic reduction in payment amount) or in parallel with payment authorization (an additional offsetting transaction), or they may be applied post purchase, for example as a statement credit. In all the above cases, a message can be sent to the consumer in real time to indicate the applied offer, coupon, discount, deal or the like. By way of example, an alert or notification may be pushed to a mobile device associated with the account to indicate that a $5 credit will post to their account within 5-7 business days. Notifications or alerts may be sent using text messaging, voice messaging, e-mail, alerts through mobile applications, or the like, Furthermore, the alert or notification may be delivered to the mobile device associated with the consumer making the payment or to another device associated with that consumer or another consumer with authorization to receive such alerts and notifications.

Merchant 308 may include a Point of Sale (PoS) device 312 and a payment processing system 310. In various embodiments, PoS 312 may be any device that may receive NFC communication, for example and can be utilized to process payment transactions. PoS device 312 may be for example, PoS devices made by VeriFone® and/or any other like devices. As illustrated in FIG. 3 by the dotted line connecting mobile device 304 to PoS device 312, mobile device 304 may be communicatively coupled with PoS device 312 using near field communication, or NFC.

Figure 5:
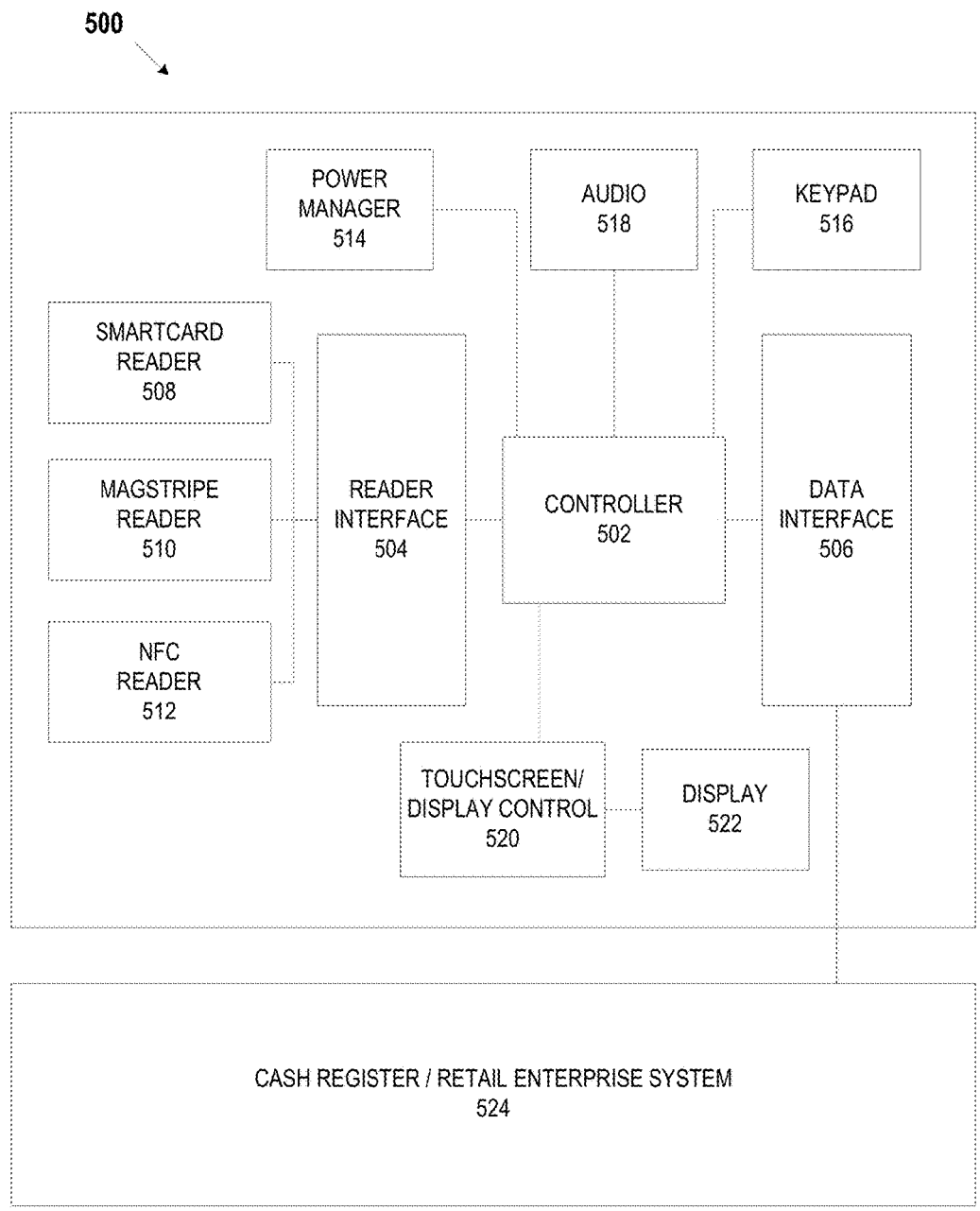
FIG. 5 depicts an example point of sale system according to embodiments of the disclosure.

FIG. 5 depicts an example Point of Sale (PoS) device 500. PoS 312 of FIG. 3 may be similar to PoS device 500. PoS device 500 may provide the interface at what a customer or end user makes a payment to the merchant in exchange for goods or services. PoS device 500 may include and/or cooperate with weighing scales, scanners, electronic and manual cash registers, electronic funds transfer at point of sale (EFTPOS) terminals, touch screens and any other wide variety of hardware and software available for use with PoS device 500. PoS device 500 may be a retail point of sale system and may include a cash register and/or cash register-like computer components to enable purchase transactions. PoS device 500 also may be a hospitality point of sale system and include computerized systems incorporating registers, computers and peripheral equipment, usually on a computer network to be used in restaurant, hair salons, hotels or the like. PoS device 500 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 500 also may be a cloud-based point of sale system that can be deployed as software as a service, which can be accessed directly from the Internet using, for example, an Internet browser.

Referring to FIG. 5, an example PoS device 500 is shown. PoS device 500 may include a controller 502, a reader interface 504, a data interface 506, a smartcard reader 508, a magnetic stripe reader 510, a near-field communications (NFC) reader 512, a power manager 514, a keypad 516, an audio interface 518, a touchscreen/display controller 520, and a display 522. Also, PoS device 500 may be coupled with, integrated into or otherwise connected with a cash register/retail enterprise system 524.

In various embodiments, Controller 502 may be any controller or processor capable of controlling the operations of PoS device 500. For example, controller 502 may be a Intel® 2nd Generation Core™ i3 or i5 or Pentium™ G850 processor or the like. Controller 502 also may be a controller included in a personal computer, smartphone device, tablet PC or the like.

Reader interface 504 may provide an interface between the various reader devices associated with PoS device 500 and PoS device 500. For example, reader interface 504 may provide an interface between smartcard reader 508, magnetic stripe reader 510, NFC reader 512 and controller 502. In various embodiments, reader interface 504 may be a wired interface such as a USB, RS232 or RS485 interface and the like. Reader interface 504 also may be a wireless interface and implement technologies such as Bluetooth, the 802.11(x) wireless specifications and the like. Reader interface 504 may enable communication of information read by the various reader devices from the various reader devices to PoS device 500 to enable transactions. For example, reader interface 504 may enable communication of a credit or debit card number read by a reader device from that device to PoS device 500. In various embodiments, reader interface 504 may interface between PoS device 500 and other devices that do not necessarily "read" information but instead receive information from other devices.

Data interface 506 may allow PoS device 500 to pass communicate data throughout PoS device and with other devices including, for example, cash register/retail enterprise system 524. Data interface 506 may enable PoS device 500 to integrate with various customer resource management (CRM) and/or enterprise resource management (ERP) systems. Data interface 506 may include hardware, firmware and software that make aspects of data interface 506 a wired interface. Data interface 506 also may include hardware, firmware and software that make aspects of data interface 506 a wireless interface. In various embodiments, data interface 506 also enables communication between PoS device other devices.

Smartcard reader 508 may be any electronic data input device that reads data from a smart card. Smartcard reader 508 may be capable of supplying an integrated circuit on the smart card with electricity and communicating with the smart card via protocols, thereby enabling read and write functions. In various embodiments, smartcard reader 508 may enable reading from contact or contactless smart cards.

Smartcard reader 508 also may communicate using standard protocols including ISO/IEC 7816, ISO/IEC 14443 and/or the like or proprietary protocols.

Magnetic stripe reader 510 may be any electronic data input device that reads data from a magnetic stripe on a credit or debit card, for example. In various embodiments, magnetic stripe reader 510 may include a magnetic reading head capable of reading information from a magnetic stripe. Magnetic stripe reader 510 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., ormat A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 512 may be any electronic data input device that reads data from a NFC device. In an exemplary embodiment, NFC reader 512 may enable Industry Standard NFC Payment Transmission. For example, the NFC reader 512 may communicate with a NFC enabled device to enable two loop antennas to form an air-core transformer when placed near one another by using magnetic induction. NFC reader 512 may operate at 13.56 MHz or any other acceptable frequency. Also, NFC reader 512 may enable a passive communication mode, where an initiator device provides a carrier field, permitting answers by the target device via modulation of existing fields. Additionally, NFC reader 512 also may enable an active communication mode by allowing alternate field generation by the initiator and target devices.

In various embodiments, NFC reader 512 may deactivate an RF field while awaiting data. NFC reader 512 may receive communications containing Miller-type coding with varying modulations, including 100% modulation. NFC reader 512 also may receive communications containing Manchester coding with varying modulations, including a modulation ratio of approximately 10%, for example. Additionally, NFC reader 512 may be capable of receiving and transmitting data at the same time, as well as checking for potential collisions when the transmitted signal and received signal frequencies differ.

NFC reader 512 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 512 may be able to utilize transmission protocols and methods that are developed in the future using other frequencies or modes of transmission. NFC reader 512 also may be backwards-compatible with existing payment techniques, such as, for example RFID. Also, NFC reader 512 may support transmission requirements to meet new and evolving payment standards including internet based transmission triggered by NFC. In various embodiments, NFC reader 512 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 514 may be any microcontroller or integrated circuit that governs power functions of PoS device 500. Power manager 514 may include, for example, firmware, software, memory, a CPU, a CPU, input/output functions, timers to measure intervals of time, as well as analog to digital converters to measure the voltages of the main battery or power source of PoS device 500. In various embodiments, Power manager 514 remain active even when PoS device 500 is completely shut down, unused, and/or powered by the backup battery. Power manager 514 may be responsible for coordinating many functions, including, for example, monitoring power connections and battery charges, charging batteries when necessary, controlling power to other integrated circuits within PoS device 500 and/or other peripherals and/or readers, shutting down unnecessary system components when they are left idle, controlling sleep and power functions (on and off), managing the interface for built-in keypad and trackpads, and/or regulating a real-time clock (RTC).

Keypad 516 may any input device that includes a set of buttons arranged, for example, in a block or pad and may bear digits, symbols and/or alphabetical letters. Keypad 516 may be a hardware-based or mechanical-type keypad and/or implemented in software and displayed on, for example, a screen or touch screen to form a keypad. Keypad 516 may receive input from a user that pushed or otherwise activates one or more buttons on keypad 516 to provide input.

Audio interface 518 may be any device capable of providing audio signals from PoS device 500. For example, audio interface may be a speaker or speakers that may produce audio signals. In various embodiments, audio interface 518 may be integrated within PoS device 500. Audio interface 518 also may include components that are external to PoS device 500.

Touchscreen/display control 520 may be any device or controller that controls an electronic visual display. Touchscreen/display control 520 may allow a user to interact with PoS device 500 through simple or multi-touch gestures by touching a screen or display (e.g., display 522). Touchscreen/display control 520 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 520 may receive inputs from the touchscreen and process the received inputs. Touchscreen/display control 520 also may control the display on PoS device 500, thereby providing the graphical user interface on a display to a user of PoS device 500.

Display 522 may be any display suitable for a PoS device. For example, display 522 may be a TFT, LCD, LED or other display. Display 522 also may be a touchscreen display that for example allows a user to interact with PoS device 500 through simple or multi-touch gestures by touching a screen or display (e.g., display 522). Display 522 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 522 may receive inputs from control gestures provided by a user. Display 522 also may display images, thereby providing the graphical user interface to a user of PoS device 500.

Cash register/retail enterprise system 524 may me any device or devices that cooperate with PoS device 500 to process transactions. Cash register/retail enterprise system 524 may be coupled with other components of PoS device 500 via, for example, a data interface (e.g., data interface 506) as illustrated in FIG. 5. Cash register/retail enterprise system 524 also may be integrated into PoS device 500.

In various embodiments, cash register/retail enterprise system 524 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 524 may comprise an retail enterprise system and/or a customer relationship management system. Retail enterprise system 524 may enable retain enterprises to manage operations and performance across a retail operation. Retail enterprise system 524 may be a stand-alone application in, for example, individual stores, or may be interconnected via a network. Retail enterprise system 524 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 524 also may include inventory control and tracking capabilities, reporting tools, customer management capabilities, employee management tools, and may integrate with other accounting software.

In various embodiments cash register/retail enterprise system 524 may be a hospitality PoS. In such embodiments, retail enterprise system 524 may include hospitality PoS software (e.g, Aloha PoS Restaurant software from NCR®, Micros® RES and Symphony software and the like), hospitality management software, and other hardware and software to facilitate hospitality operations.

Referring back to FIG. 3, payment processing system 310 may allow merchant 308 to request and process payments, for example. Payment processing system 310 may utilize network 306 to communicate payment requests to issuer system 302 and receive authorization requests. In doing so, payment processing system 310 may transmit information to issuer system 302 using, for example, networks maintained by Visa®, MasterCard®, Discover®, American Express®, Automated Clearinghouse (ACH), private label/closed loop networks, such as merchant-specific payment cards, and the like. Also, payment processing system 310 may be capable of communicating token information using data standards defined by the above-described networks as will be describe in detail below.

Merchant 308 may also be in communication with an acquisition system 328. The acquisition system may include message specification to handle various versions of DPPs, including tokens. Furthermore, the acquisition system 328 may be able to receive a DPP from the merchant 308 and provide that DPP to the issuer 302 included with an authorization request. Once the authorization module 320 processes the request, the acquisition system 328 may receive the authorization response, transaction ID and an actual account associated with the transaction. The authorization system 328 may then convert that data to return the authorization response, transaction ID and a token back to the merchant 308.

Figure 6:
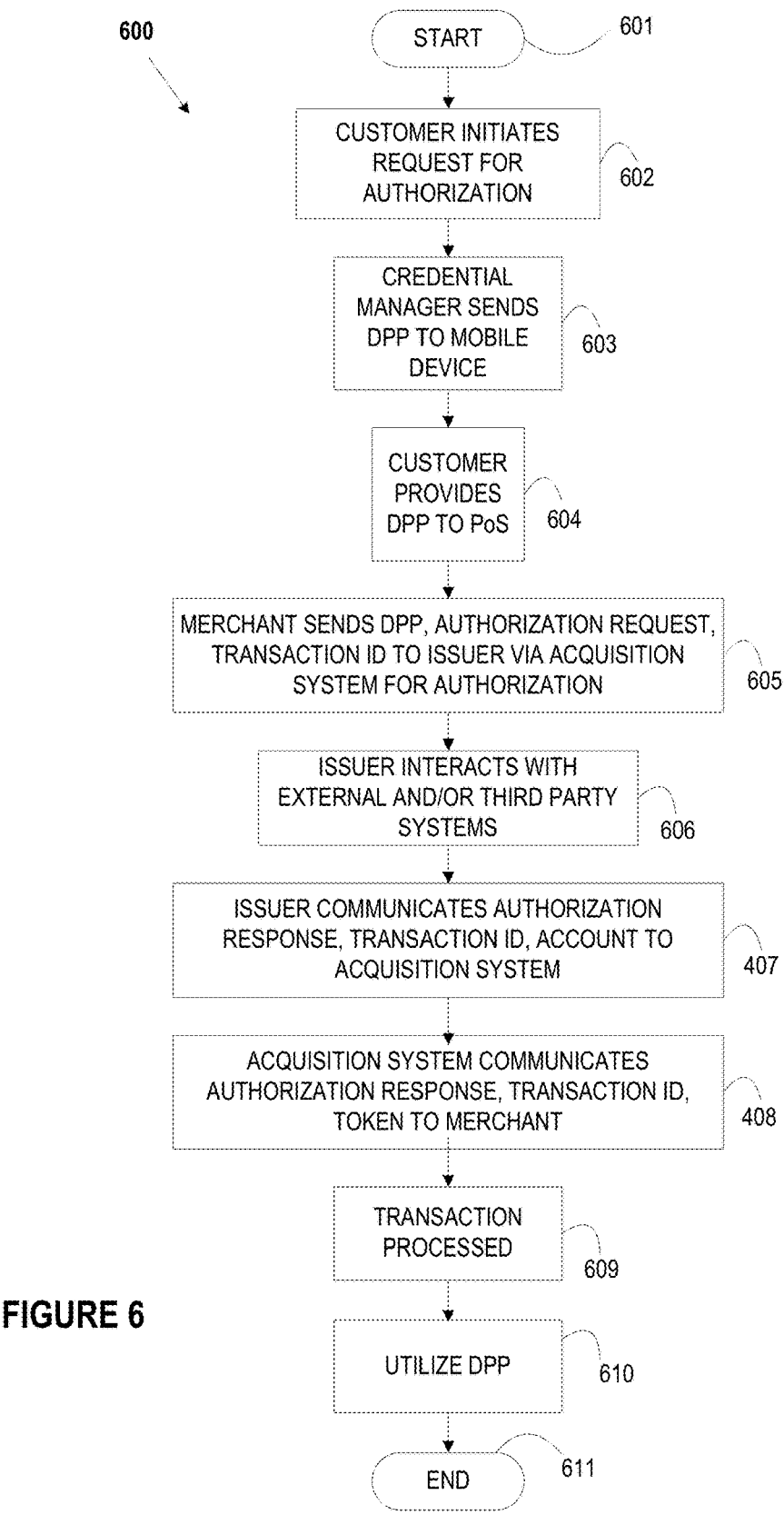
FIG. 6 depicts an exemplary method for token-based commerce and payments according to embodiments of the disclosure.

FIG. 6 depicts an exemplary method 600 for a software-based approach to contactless payment. Method 600 may begin in block 601.

In block 602, a customer may initiate a request for an authorization of a payment. In various embodiments, a customer may utilize a mobile device enabled for software-based contactless payment to "tap" a PoS device, for example to initiate the request for authorization using a token at the time of a transaction. A customer may also initiate a request by requesting a token through a mobile payments application using a mobile device. In various embodiments, a customer may request a token before or at the time of purchase to enable or facilitate the customer's purchase. A customer may use a software application, such as a mobile banking or like application to facilitate the request for a token. To access the software application, a user may be required to enter a personal identification number (PIN) to unlock the access and/or unlock the software application. The customer may also present responses to multifactor authentication requests or challenges. In this way, the token associated with a PIN and/or multifactor authentication may provide additional security for a transaction.

In block 603, the token may be sent to a customer's mobile device. For example, a DPP manager may send a DPP including a token, for example, to mobile device using a communication network and/or various communications similar to those described in FIG. 3. Also, a DPP manager may transmit a DPP, including a token, for example to a mobile device via, for example, authorization networks and/or a network associated with a PoS device. The token may be received at the mobile device and then processed by a software application executing on the mobile device to facilitate for example, software-based contactless payment. The software application may, for example, display the token to the customer on the mobile device.

In block 604, a customer may provide the token to a PoS device. This token could be provided at the time of purchase. For example, a could input the token on a keypad of the PoS device. The customer may also utilize the NFC features on the mobile device to transmit the token to the PoS device wirelessly. Upon receipt of the token at the mobile device, the token may be displayed to the customer and then the customer may touch a "transmit" button appearing on the display of the mobile device to transmit the token via NFC. Other methods of communicating the toke may be used.

Upon receipt of the token, the merchant, using a payment processing system, for example, in cooperation with the PoS device, may format the token into a data format that may be utilized by one of the various authorization networks. For example, an exemplary 6-digit token may be inserted into one of the "tracks" of data utilized by the Visa or other authorization networks to transmit and receive data. A token may also be transmitted in a data packet via a communication network associated with a merchant, for example. In various embodiments, a customer may be required to input a PIN and/or respond to a multifactor authentication challenge before transmitting or providing the token to a PoS device.

In block 605, the merchant may send the token, an authorization request, and a transaction identifier to the issuer for authorization via an acquisition system. For example, the merchant may send a token to the issuer via an acquisition system using a communication network and/or various communications similar to those described in FIG. 3.

In block 606, an issuer (e.g., issuer 302) may interact with an external system (e.g., external system 326 and/or a third party system 324). By way of example, an external system 326 may be a creditor system, such as those associated with Visa®, MasterCard®, Discover®, or American Express®, and a third party system 324 may be a financial institution system. Additional external systems 326 or third party systems 324 may include those housing data disclosed above in relation to the customer database 322. The data relating to the customer database 322 may also be accessed and, regardless of whether it is housed in the customer database 322 or an external system 326 or third party system 324, the data may be updated in the database or system and added to the information to be sent back to the merchant.

In block 607, an issuer (e.g., issuer 302) may communicate an authorization response, transaction ID, and account data to the acquisition system 328. As disclosed above, the acquisition system 328 may then convert the received account data into a token to be transmitted to the merchant 308.

In determining an authorization response, the issuer 302 and/or token manager may verify the token and/or transaction utilizing the token. For example, the issuer 302 may use the token to look up the account of the customer and determine whether the transaction should be authorized. The issuer and/or token manager may also check the token against certain parameters to determine, for example, whether the transaction complies with certain parameters or the token has expired. In various embodiments, the issuer and/or token manager may receive and utilize location information or identification information associated with the customers mobile device to determine whether to authorize the transaction. For example, the issuer 302 and/or token manager may receive and utilize the MAC address of a smartphone and/or the merchant location to determine whether to authorize the transaction The authorization may indicate, for example, that the token provided by the customer matches the token provided to the customer upon request by the customer and/or the token matches a limited use token. The authorization may also indicate that the customer may have sufficient funds to make a purchase. The authorization response may further include any data relating to the data disclosed above with respect to the customer database 322 (e.g., reward points to be used, offers to be obtained, etc.).

In block 608, the acquisition system 328 may then communicate the authorization response, transaction ID and token to the merchant. The transmission and receipt of data may alternatively bypass an acquisition system all together and simply flow between the issuer 302 and the merchant 308.

In block 609, the transaction may be processed. For example, the transaction may be processed by an issuer to post the transaction to the customer's account and ensure payment to the merchant.

In block 610, the DPP may be utilized by the merchant and/or the issuer to enhance the payment experience of the user as described above. For example, depending upon the additional data elements included in the DPP, the DPP may be utilized to make additional offers and/or upsells to the user. In block 611, method 600 may end.

In the preceding specification, various preferred have been described with references to the accompanying drawings. Although the above description references an "issuer" it will be understood that the term issuer could apply to issuers of revolving or transactional credit, charge, debit, stored value (prepaid, gift, etc.), and like payment mechanisms. It will also be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A method for software-based contactless payment using an acquisition system, comprising:
   providing, via a network and by an issuer system, a dynamic payment packet that includes a first token and an additional data element comprising customer creditworthiness information to a mobile device of a customer for use with a transaction, the first token comprising a single-use token;
   receiving, via the acquisition system, the dynamic payment packet in association with the transaction;
   transmitting the dynamic payment packet to a third party system to obtain offer data from the third party system based on the customer creditworthiness information;
   transmitting, via the acquisition system, data associated with the dynamic payment packet to the issuer system for authorization of the transaction, the authorization being based on whether the first token complies with a plurality of parameters and whether the first token is associated with the mobile device, the plurality of parameters comprising transaction limits, use limits, and time limits;
   determining, by the issuer system, an authorization response based on the offer data from the third party system and data received from the issuer system authorizing the transaction;
   transmitting, to the acquisition system by the issuer system, the first authorization response, a transaction identifier, and account data associated with the transaction, wherein the acquisition system converts the account data to create a second token and transmits the second authorization response, the transaction identifier, and the second token to a merchant system for customer approval and merchant transaction posting; and providing, to the mobile device by the issuer system and responsive to the transmission of the authorization response, the transaction identifier, and the second token, real-time financing options related to the payment of the transaction and cross-selling of lending products based on the offer data.

2. The method of claim 1, further comprising: receiving, via a network, a request for the dynamic payment packet from the customer.

3. The method of claim 1, wherein the dynamic payment packet is received as track data in a credit card transaction.

4. The method of claim 1, further comprising:
accessing, by the issuer system, a database storing a list of provided tokens, and wherein the authorization response is based on a comparison of the received first token to the list of provided tokens.

5. The method of claim 1, wherein the received dynamic payment packet is transmitted in response to a personal identification number provided by the customer.

6. The method of claim 1, further comprising:
receiving, by the issuer system, an identifier associated with the mobile device, wherein the authorization response is further based on the identifier.

7. The method of claim 1, wherein the additional data element further comprises customer profile information and the offer data includes a targeted offer based on the customer profile information.

8. The method of claim 1, wherein the additional data element further comprises reward point credentials and the offer data includes an offer to pay with rewards points.

9. A system for software-based contactless payment, the system comprising: a computer comprising a processor and computer readable instruction stored on a non-transitory medium, which when executed by the processor, causes the processor to perform the acts of:
generating a dynamic payment packet and providing the dynamic payment packet via a network to a mobile device of a customer for use with a transaction, wherein the dynamic payment packet includes a first token and an additional data element comprising customer creditworthiness information, the first token comprising a single-use token;
receiving, via an acquisition system, the dynamic payment packet in association with the transaction;
transmitting the dynamic payment packet to a third party system to obtain offer data from the third party system based on the customer creditworthiness information;
transmitting, via the acquisition system, data associated with the dynamic payment packet to an issuer system for authorization of the transaction, the authorization being based on whether the first token complies with a plurality of parameters and whether the token is associated with the mobile device, the plurality of parameters comprising transaction limits, use limits, and time limits;
determining, by the issuer system, an authorization response based on the offer data from the third party system and data received from the issuer system authorizing the transaction;
transmitting, to the acquisition system by the issuer system, the authorization response, a transaction identifier, and account data associated with the transaction, wherein the acquisition system converts the account data to create a second token and transmits the authorization response, the transaction identifier, and the second token to a merchant system for customer approval and merchant transaction posting and
providing, to the mobile device by the issuer system and responsive to the transmission of the authorization response, the transaction identifier, and the second token, real-time financing options related to the payment of the transaction and cross-selling of lending products based on the offer data.

10. The system of claim 9, wherein the processor further performs the act of processing a request for the first token from the customer in order to generate the dynamic payment packet.

11. The system of claim 9, wherein the dynamic payment packet is received as track data in a credit card transaction.

12. The system of claim 9, further comprising:
a database that stores a list of provided tokens, and wherein the authorization response is based on a comparison of the received first token to the list of provided tokens.

13. The system of claim 9, wherein the received first token is transmitted in response to a personal identification number provided by the customer.

14. The system of claim 9, further comprising: transmitting, by the issuer system, an identifier associated with the mobile device, wherein the authorization response is further based on the identifier.

15. The system of claim 9, wherein the additional data element further comprises customer profile information and the offer data includes a targeted offer based on the customer profile information.

16. The system of claim 9, wherein the additional data element further comprises reward point credentials and the offer data includes an offer to pay with rewards points.

* * * * *